Figure 3:
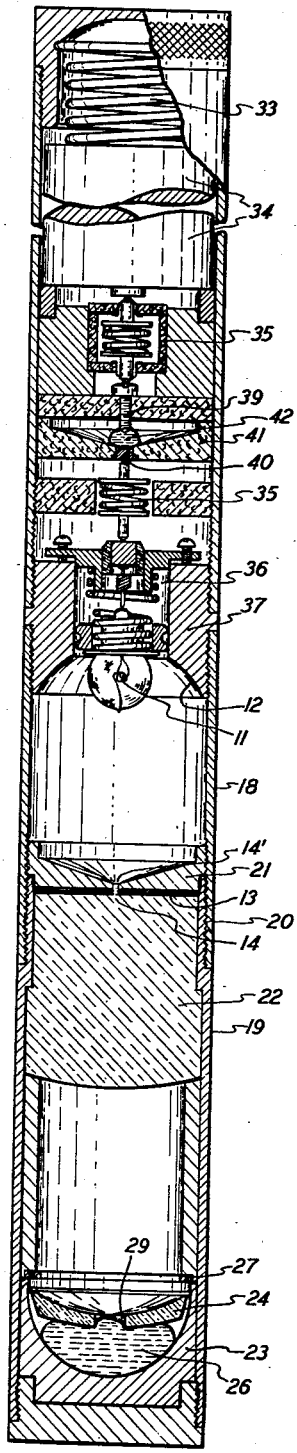

June 24, 1941.　　　　P. JONES　　　　2,246,519

DRIFT RECORDER

Filed March 18, 1939

PHILIP JONES
INVENTOR

Paul W. Bridgman
ATTORNEY

Patented June 24, 1941

2,246,519

UNITED STATES PATENT OFFICE 2,246,519

DRIFT RECORDER

Philip Jones, Los Angeles, Calif.

Application March 18, 1939, Serial No. 262,666

14 Claims. (Cl. 33—205.5)

This invention relates to the class of apparatus of which the purpose is to record the deviation from the vertical, or so-called "drift," of earth bores such as oil wells, while such wells are in the process of drilling.

The instruments for recording such drift which are in most general use consist of mechanical recording means whereby a transversely disposed record disk is pierced by a point attached to a pendulum or plumb bob responsive to inclination of the instrument, or of means whereby the displacement of a suspended target is photographically recorded upon a similarly disposed disk of sensitized paper or film.

Of these types, the mechanically operated mechanisms are inherently subject to inaccuracy because of the conflicting requirements of such ruggedness as to withstand the shock due to the piercing operation referred to and of such sensitivity of support for the pendulum as to permit its accurate response to the changes of position on which the proper functioning of the apparatus depends. This conflict is further aggravated by the very severe abuse to which such instruments are subjected in their normal environment and usage.

The photographically operated devices are subject to the same conflicting requirements and to the additional objection that the photographic record must be developed, which is the cause of many failures despite the ingenious developing devices appurtenant to such apparatus. Even with these adjuncts, the development of photographs is an operation not ordinarily within the technical ability of the ordinary drilling crew.

Both types of instrument require that there be some form of timing mechanism, such as a watch, in order that their functioning may be delayed during the period required for the apparatus to reach the bottom of the hole, this time being of course estimated in advance by the operator.

This requirement for pretiming of the functional operation of the instrument not only adds still another source of failure in the delicately constructed watch mechanism, but also introduces a serious liability to inaccuracy because of the possible erroneous estimate of the time requirement. It is well known that the rate of descent of such apparatus through the fluid in the drill pipe, whether dropped freely therethrough or lowered on a suspending line, varies greatly with such factors as the diameter of the pipe, the viscosity and specific gravity of the mud, the weight of the apparatus, and others.

It is out of the question, in practice, to attempt to make any closely accurate determination of the required time, involving all these variables; so the customary procedure is that the driller makes a rule-of-thumb estimate of the rate of fall, and gives himself a wide margin to allow for errors. This procedure results in serious loss of time in the major operation of drilling the well.

A further serious disadvantage, which is inherent principally in the mechanically operated devices previously referred to, is that there is no indication by the record itself that it was made at the bottom of the hole, as intended; that is, whether it was properly timed or not. For example, if the driller's estimate of the time be incorrect, or if his setting of the watch be erroneous, the probably excessive inclination shown by the resulting record (made while the apparatus was in motion) may be interpreted as sufficient justification for the laborious and expensive operation of straightening the hole. Many cases of such wasted effort are known to have occurred.

In the invention herein described these objections are overcome by the use of a position-responsive element so supported that it cannot be deranged by any abuse short of destruction, and yet which is so sensitively responsive to movement that no record can be made except when the instrument is at rest.

This latter characteristic of the device permits its practical use without any auxiliary timing mechanism whatever, thus eliminating a troublesome adjunct and achieving an important simplification and saving of time in the operation of the device.

Figure 1:
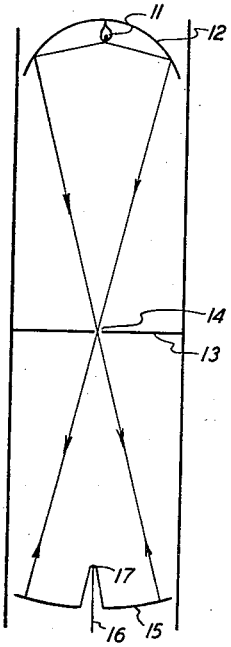
Figure 4:
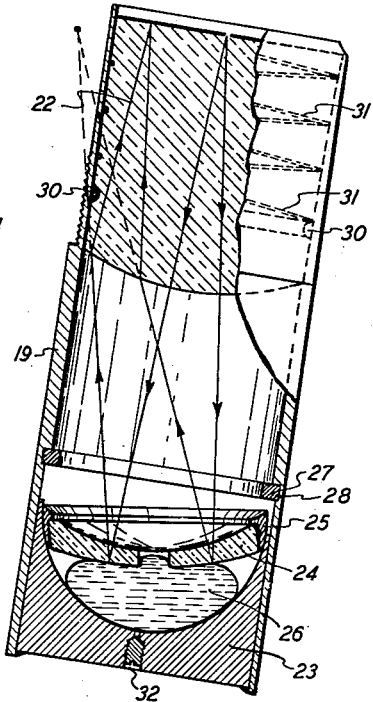
Figure 2:
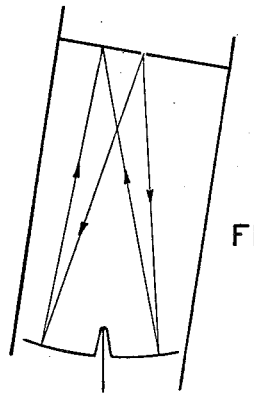

In the accompanying drawing Figures 1 and 2 are outline diagrams showing the optical functioning of the device in vertical and inclined positions; Fig. 3 is a drawing of a preferred form as adapted to a working instrument, and Fig. 4 is a repetition of the lower portion of Fig. 3 shown in an inclined position.

Referring to Fig. 1, the filament 11 of a miniature electric lamp is mounted at the focus of an ellipsoidal reflector 12. A perforated disk 13, shielded on its upper and sensitized on its lower side, is mounted transversely to the axis of the ellipsoid 12 so that the perforation 14 in said disk is at the other focus of the ellipsoid. A spherical mirror 15 is so supported, as by a pivot 16 and a bearing 17, that its axis is vertical irrespective of instrument position and so that the distance from the center of the mirror 15 to the perforation 14 is equal to the radius of curvature of the mirror surface.

Light rays from the filament 11, at the focus of the ellipsoid 12, are reflected thereby to the other focus. Due to the aberrations of the ellipsoid no sharp image of the filament is there produced, but rather a bright spot of light. Some of this light is projected through the perforation to form a pencil of rays which impinge upon the surface of the mirror 15 normally thereto (the mirror being coaxial with the pencil when the instrument is vertical). The rays are therefore reflected back along their incident paths and form an image of the perforation at the perforation itself.

When the instrument is inclined, as in Fig. 2, the incident rays, not being normal to the mirror surface, are reflected thereby toward a point on the record disk surface at a distance from the center thereof (that is, the perforation 14) which distance is a measure of the angular inclination of the instrument, and form a more or less sharply focussed image of the perforation at that point.

The simple assembly shown in Figures 1 and 2 is not well adapted to withstand the rough usage to which drift recorders are subjected, and is incapable of producing well defined records except for small angles of inclination.

These objections are overcome in the working apparatus, of which Fig. 3 is an illustration.

A sectional housing consisting of tubes 18 and 19, separably coupled by a screw thread joint 20, supports in coaxial alignment an ellipsoidal reflector 12, an opaque plate 21 having a central hole 14', a transversely disposed record disk 13 having a central hole 14, a plano convex lens 22 and a hemispherical cup 23. Of these elements, the reflector 12 and the plate 21 are permanently mounted in the upper section 18 of the housing; and the lens 22 and cup 23 are permanently mounted in the lower section 19 of the housing. The lens 22 is mounted so that its upper plano surface is slightly below the upper end of the tube 19. The sensitized record disk is placed face down on the plano surface of the lens 22, the extended end of the tube 19 engaging its edge so as to maintain it in position. The plate 21 is so placed in the companion tube 18 that when the sections 18 and 19 are coupled together the plate holds the record disk in functional contact with the lens 22.

The reflector 12 supports a miniature electric lamp so that the filament 11 of the lamp is approximately at the adjacent focus of the ellipsoidal segment. The plate 21 is so placed that when the sections 18 and 19 are coupled together, the perforation 14 of the record disk 13 lies substantially at the remote focus of the ellipsoid 12.

A negative meniscus lens 24 is spun into a metallic ring 24 (see Fig. 4), of which the edge is a spherical segment of the same or slightly smaller radius than that of the hemispherical cup 23, the diameter of the ring being such that its lower edge will lie considerably below the center of the hemisphere of the cup when placed therein as is hereinafter described.

The lens 24 is so ground that the convex surface is centered at the aplanatic image point of the concave surface. The convex surface is silvered and the silver is protected by a mercury-resistant enamel.

Such a lens is substantially equivalent to a spherical mirror (e. g. 15 of Fig. 1) of which the radius of curvature is equal to the aplanatic object distance of the concave surface of the lens; that is, rays proceeding from the aplanatic object point are refracted at the concave surface so as to impinge normally upon the convex, silvered surface and are therefore reflected back along their incident paths to the concave surface and are there refracted so as to focus at the object point. In view of this substantial equivalence, the lens and ring assembly will be hereinafter referred to as the mirror 15, the aplanatic object point as the center of curvature, and the aplanatic object distance as the radius of curvature of the mirror.

The mirror 15 is placed in the cup 23 and a quantity of mercury 26 is introduced into the cup which is just sufficient to raise the mirror. A spring ring 27 retained in a recess 28 may be used to prevent excessive movement or overturning of the mirror in case the device be accidentally inverted.

This assembly of mirror 15, cup 23, and mercury globule 26 constitutes the position-responsive element of the device. Referring to the drawing, it will be seen that the mirror, being convex on its lower surface, rides on the mercury globule so that the circle of contact between the mercury surface and that of the mirror is well below the edge of the mirror. The lower surface of the mirror is of a material that is not wetted by mercury, so that the mirror is supported almost wholly by the surface tension of the mercury. So supported, the capillary forces are in equilibrium only when the mirror is concentric with the globule, and these forces themselves restore the mirror to the position of equilibrium after disturbance therefrom.

It will be seen that when the instrument is at rest in any position within the angular range it is intended to record, the mercury globule will lie at the bottom of the cup, and that because of the spherical shape of the cup, the shape of the globule is independent of instrument position. Therefore, there being no change in the shape of the globule, there is no change in the capillary equilibrium; so that during any except rapid changes of instrument position the globule moves to its position of equilibrium, en masse, and carries the mirror with it. It is important to note that after any disturbance of the apparatus, during which disturbance the mirror may strike the cup, the oscillations resulting therefrom quickly restore the mirror to its equilibrium position on the crest of the globule; that as it comes to rest the final oscillations are quickly damped, and that during these final oscillations there is no movement of the line of contact between the mercury and mirror surface. Thus the final oscillations of the mirror occur when the mirror is maintained in its central position by capillary forces and the mirror comes to rest substantially without frictional resistance.

During any motion of the apparatus, the movement of the mercury globule and mirror, en masse, as above explained, is accompanied by vibratory movements, by which the point of light is moved rapidly over the record surface. This phenomenon is utilized for the very important practical purpose of dispensing with the timing mechanism hereinabove referred to. This is accomplished by choosing for the record disk a sensitive paper that is too "slow" to record these vibrations, resulting in the highly desirable characteristic for the instrument that it makes a record only when at rest. During the ordinary, routine procedure of loading the instrument, enclosing it in a suitable barrel, lowering and retrieving, the vibratory movements of the mirror incident to such handling are sufficient to prevent any record's being made; so that the only requirement upon the driller is that he allow the device to remain at rest at its desired position for such time as is required for the exposure.

It is believed that the instrument is unique in this respect. There are a number of devices in which the record is made by photographic means, but so far as applicant is aware, they all produce records which consist of photographic pictures of relatively large areas, such as scales, mirror surfaces, targets, or the like, of which the superimposed images, during motion of the apparatus produce unintelligible records, and so falsely expose the record surface that a proper record, made while the instrument is at rest, is impossible. In the instant device, the record is made by a relatively long time exposure of a relatively minute spot of light. During agitation of the device, this spot of light moves in a haphazard path over large areas of the record surface so that no part of the record surface received sufficient light to affect it. In practice, for example, using a three-watt lamp mounted as described, and with record disks of the well-known Eastman printing-out proof paper, a satisfactory record is produced holding the instrument quiet for thirty seconds, but no appreciable darkening of the record surface is occasioned by an hour's exposure during haphazard motion of the instrument.

In addition to the remarkable accuracy of functional response to changes of position obtained by this method of supporting the mirror on the mercury globule, this construction also provides almost perfect protection of the mirror against the shocks incident to its use.

It is well known that the most damaging of these shocks are those occasioned by the barrel in which the instrument is enclosed striking tool joints or upsets in the drill pipe. It is difficult within the space limits available properly to cushion the apparatus, as a whole, against such lateral shocks.

In the present invention the mirror, which is the only element liable to damage, is largely cushioned by the globule of mercury, which moves bodily in response to such lateral shocks to a position best adapted to cushion the mirror against the same acceleration. Besides this cushioning effect of the mercury globule, the shocks to which the mirror is subjected are borne by the large area of the spherically formed edge of the mirror, resulting in a position-responsive element which completely avoids the necessity of compromise between sensitivity and ruggedness heretofore enforced.

This may be otherwise expressed: The position-responsive element is supported in its functional position principally by the surface tension of the globule, which is of course not damaged by shocks previously received. During the transit of the instrument to and from its position of use, shocks are borne by structures able to withstand them. This accomplishes automatically what is accomplished manually in such instruments, for example, as a surveyor's compass, in which the delicately supported compass needle is lifted off its pivot during transportation of the instrument.

It will be obvious that during the violent agitations encountered by the apparatus in its use, some of the mercury will be splashed upon the upper surface of the mirror. In order to permit the return of such mercury to the globule, a hole 29 is bored in the center of the mirror, the edges of the hole being preferably rounded and polished. It is because of this splashing of mercury that the silvered aplanat is preferred over the simple spherical mirror shown in Fig. 1. For equal "radii of curvature" as hereinabove defined, the concave surface of the aplanat is much more deeply curved than in the simple mirror. For example, with glass of 1.5 refractive index, the radius of curvature of a simple mirror is 2.5 times that of the upper surface of an equivalent aplanat. This deep curvature insures that no drops of mercury large enough to affect the accuracy of the device will be lodged on the mirror.

This assembly is so mounted in the tube 19 that the "center of curvature" of the mirror 15 coincides with the center of perforation 14 of the record disk 13 when the instrument is in a vertical position. In this position, rays from the filament 11 of the lamp are projected through hole 14' in plate 21 and through perforation 14 in the record disk, as previously described with respect to Fig. 1. The pencil of rays so projected is narrowed by refraction at the plano surface of the lens 22. The convex surface of this lens, of which the center of curvature is at the perforation 14, of course has no refractive effect upon rays from that point. These rays are therefore focussed at the perforation, as described above. That is, the lens 22 has no optical function when the instrument is vertical.

Upon inclination of the instrument, as illustrated in Fig. 4, the rays, which would otherwise be projected to form an out-of-focus image upon the record disk, are refracted at the convex surface of the lens 22 to a sharp focus in the plane of record disk 12, as shown.

With glass whose refractive index is approximately 1.5 satisfactory correction is obtained if the radius of curvature of the convex surface is one-half that of the mirror.

The evaluation of the inclination recorded by the point of light is either by means of a graduated scale or by circles inscribed on the disk. It will be seen that the distance from the perforation in the center of the disk to its recorded image is a function of the inclination of the instrument and of the optical constants thereof. This fact permits the elimination of any other reference index, such as cross hairs, or the like, to which the displacement of the record point must be referred. That is, the perforation and its image being in the same focal plane, the optical system is self-collimating.

It has been the experience of the applicant and of others concerned in the operation of such devices that a frequent cause of inaccuracy of function is in the disturbance of the previously established positional relationship between relatively stationary and movable indices, occasioned by shocks, that is, the loss of collimation, by which false records are produced.

In the present invention, accuracy of function is conditional only upon the inbuilt precision of alignment between the cup 23 and the upper end of the tube 19 by which the record disk is maintained in position. Inasmuch as this precision of alignment is inherent in the ordinarily precise machine-shop practice by which these parts are fabricated and assembled, and inasmuch as these parts are not damaged even by the extraordinarily rough treatment that they receive in practice, this built-in freedom from collimation errors is permanently maintained.

It is almost essential to a proper working of the apparatus that the interior of the section 19 of the housing be sealed against the intrusion of air and, preferably evacuated.

The circuit through which the lamp is energized includes the upper portion 18 of the metallic tube, a spring 33 bearing against the upper end of the tube and urging dry battery 34 downwardly, one or more conventional resilient contactors 35—35 supported by and insulated from tube 18, and a suitable metallic supporting means for the lamp 11, this means being generally indicated at 36 and being in electrical contact with tube 18 through the metallic body 37 on which ellipsoidal mirror 12 is formed. So arranged the lamp is energized continuously as long as the battery is in position.

Although no false record is produced in the normal operation of the device as described, even with the lamp energized during the whole time of its assembly and use, it is desirable, for the sake of battery and lamp economy, that the light be not "on" except when needed.

This may be accomplished by a simple switch arrangement such as that generally indicated at 38 in Fig. 3. Contacts 39 and 40 extend through the top and bottom of covered conical cup 41 of insulating material. Within the cup a globule of mercury 42 completes the circuit between the opposed contacts when the instrument is stationary at an angle of inclination within its intended range. During the agitation attendant on the passage of the apparatus through the drill pipe, the mercury globule, moving in response to this agitation, is seldom in its functional position at the bottom of the cup, resulting in a considerable gain in life of battery and lamp. The occasional flashes of the light during this disturbance have no effect on the record disk, as hereinabove described.

The explanation of the method of operation of the device thus far has been with respect to now almost universal method of running such devices; that is, on the line by which they are lowered and retrieved.

For adaptation to the now obsolescent method of operation in which such apparatus is freely dropped in a "go-devil" through the fluid in the drill pipe, the apparatus being later recovered upon withdrawal of the drill pipe from the hole, a delayed-time switch mechanism may be substituted for the simple device just above described. By such a switch mechanism, the closure of the energizing circuit may be delayed for about a minute after any disturbance of the apparatus. This prevents the making of multiple records during the times when the drill pipe is stationary in the routine operation of its withdrawal.

Throughout the foregoing description, the discussion has been as with respect to an infinitely small perforation in the record disk, to produce a "point" of light, the image of which point is projected to the record surface for the functional purposes of the instrument. It is not desirable, in practice, that the perforation approach point dimensions. A very small perforation in the disk produces a photographic record which is barely visible, and which is confused by the presence of diffraction rings.

In the working instruments, therefore, the perforation is a small circular hole, of about .03" diameter, or, preferably, of a small hole of comparable area of such shape that its image may be readily distinguished from spots as of oil or mud which may accidentally appear on the record.

Inasmuch as the area of image of such a small hole, in such an instrument as is drawn to scale in the accompanying illustrations is only about 0.0005 that of the record disk over which it moves in a random path during agitation of the device, no appreciable darkening of the record surface occurs during such motion in the normal operation of the device.

In the accompanying claims, for facility of expression, such a small hole in the record disk will be referred to as a perforation, and its projected image or images as points. In other words, the claims, reading on the central point of such a small hole, are intended to refer to the entire area thereof.

In further reference to the attached claims: It will be observed that because of the hole in the reflector 12, and of the hole in the mirror, no paraxial rays are received on the mirror surface.

It is believed that confusing circumlocution may be avoided in the claims by considering that the missing central area of the mirror is present so that the functioning of the optical train may be stated, as is customary in such statements, with respect to the ideal paraxial region thereof.

Throughout the foregoing description it has been considered that the perforation 14 in the plane of the record disk is itself imaged thereon. It will be seen, however, that by slight variation in the physical dimensions of the apparatus, the image of the hole in the plate 21 may be imaged on the record disk. This expedient is in fact sometimes adopted in practice, as when the plano surface of the lens 22, after long use, becomes so marred as to require repolishing; so that the ideal position of the perforation at the center of the mirror is lost.

It is believed that such a modification is within the spirit of the invention, and it is intended that the claims herein, defining ideal relationships, shall embrace such departures from those ideals as that suggested above.

The form of the invention herein described is preferred because it is believed to be the simplest arrangement that can be devised which is ideally free from spherical aberration, coma, and astigmatism when the instrument is vertical, and in which these aberrations are negligible throughout the range of inclination which such instruments are now customarily used to record. Chromatic aberration is also negligible because of the narrow spectral band functionally available with the light source and sensitive paper which for other reasons are preferred.

It is not intended, however, to limit the invention to the optical arrangement specifically described herein as it is obvious that many variants thereof may be made by changing the focal relationships of the several optical elements.

For example: The lens 22 has been described as having only one functional surface, this surface being centered at the perforation in the record disk. With this form, the pencil of rays from the perforation is unaffected by that surface, and the mirror is so positioned that its center of curvature is at the perforation. If, however, the perforation is not at the center of curvature of the lens surface, the mirror must be so placed that its center of curvature is at the image of the perforation as formed by the lens, these references, of course, being as with respect to the position of the mirror when the instrument is vertical.

For further example: If the lens 22 were replaced by a lens of which the perforation is at the principal focus, a plane mirror would be substituted for the spherical mirror described.

Such variants are believed to be within the spirit of the invention and it is intended that these variants are claimed.

With further reference to the appended claims: It can be shown that the angle of incidence of the rays impinging on the mirror of all such variants may be stated by the equation:

$$\sin i = \sin (A+B) - \sin B$$

where $i$ is the angle of incidence; A is the angle of inclination; and B is the angle of the incident ray with the axis of the pencil.

It will be seen that this relationship is independent of the radius of curvature of the mirror, and that it expresses the condition that when the inclination is zero, the angles of incidence of the rays are also zero; that is, that the rays are normal to the mirror surface and are therefore reflected back along their incident paths as is hereinbefore explained.

It will be seen also that when angles A and B are small, as they are in practice, the sines of the angles are substantially proportionate to the angles themselves, so that the angles of incidence are substantially equal to the angle of inclination of the instrument.

In claims, therefore, it will be understood that by "substantial" equivalence is meant such order of equivalence as is indicated by the foregoing equation.

I claim as my invention:

1. In a drift recorder: a tubular housing; a centrally perforated light-sensitive record disk transversely disposed in said housing; means for projecting light rays through the perforation in said disk, and inclination responsive means for projecting the rays so projected upon said record disk so as to produce a record of the inclination of said housing.

2. In a drift recorder: a tubular housing; a centrally perforated light-sensitive record disk; a mirror adapted to assume a constant position with respect to the vertical; means for projecting light rays through the perforation in said disk; means including said mirror whereby an image of the perforation in said disk is projected upon the said record disk.

3. In a drift recorder: a housing; a perforated, light-sensitive record disk; means for illuminating the perforation in said disk; a mirror adapted to form an image of said perforation and to assume a constant position with respect to the vertical; a lens adapted to form an image of the said image upon the said record disk at a position thereon characteristic of the inclination of the said housing, and means for photographing the said second mentioned image upon said record disk.

4. In a drift recorder: a tubular housing; a light-sensitive record disk transversely disposed with respect to said housing; a spherically formed cup coaxial with said housing; a globule of mercury within said cup; a mirror supported on said globule; means including said mirror whereby the position of said mirror with respect to said housing is photographically indicated on said record disk.

5. In a drift recorder: a tubular housing; a centrally perforated record disk; means for projecting light rays through the perforation in said disk; a mirror so formed and so positioned with respect to the said perforation that the said rays so projected are reflected by said mirror so that the angles of reflection of the said rays are substantially equal to the angle of inclination of said housing.

6. In a drift recorder: a tubular housing; a light-sensitive record disk transversely disposed with respect to said housing; an illuminated point; a lens adapted to assume a position so that its axis is vertical; a reflecting surface associated with said lens whereby rays from the image of said illuminated point formed by the said lens are returned along their incident paths when the said housing is vertical.

7. In a drift recorder; a tubular housing; an optical train consisting of a centrally perforated record disk, a lens, a mirror, the said lens and the said record disk, in the order recited; the said lens and the said mirror being so related that an image of the perforation in said record disk is projected upon the surface thereof; means associated with said mirror whereby the position of the said image on said disk is determined by the inclination of said housing; photographic means whereby the position of said image on said disk is recorded.

8. In a drift recorder having a mirror arranged to project a pencil of light rays onto a light-sensitive record surface: a mirror mounting comprising a cup and a globule of mercury therein, said mirror supported on said globule, the radially exterior upper surface of said globule being convexly curved.

9. In a drift recorder comprising a transversely disposed record disk upon which a record of instrument position is made by an inclination-responsive element universally movable about a fixed point: a support for said element consisting of a globule of mercury so arranged as to tend to form a convex upper surface in any operating position of said recorder.

10. In a drift recorder comprising a transversely disposed record disk upon which a record of instrument position is made by an inclination-responsive element universally movable about a fixed point: a support for said element consisting of a globule of mercury retained in a spherically formed cup arranged in fixed position in said recorder.

11. In a drift recorder comprising a light-sensitive record member upon which a record of instrument position is made by photographic means including an inclination-responsive mirror movable about a fixed point; a support for said mirror consisting of a globule of mercury retained in a spherically formed cup arranged in fixed position in said recorder.

12. In a drift recorder comprising a light-sensitive record member upon which a record of instrument position is made by photographic means including an inclination responsive mirror movable about a fixed point; a support for said mirror consisting of a globule of liquid retained in a spherically formed cup arranged in fixed position in said recorder.

13. In an instrument adapted to record its own inclination comprising a transversely disposed record member upon which a record is made by means including an inclination-responsive member; an inclination-responsive assembly consisting of a body of liquid adapted to maintain its surface radially symmetrical about a vertical axis, the said body of liquid supporting an element radially symmetrical about its own axis.

14. In a drift recorder: a tubular housing; a light-sensitive record member transversely disposed with respect to the axis of said housing; an illuminated point on the axis of said housing; a mirror adapted to assume a position in which its optical axis is vertical and to project an image of the said illuminated point upon said record member at a distance from the axis of said housing characteristic of the angle of inclination of said housing.

PHILIP JONES.